(12) United States Patent
Zeng et al.

(10) Patent No.: US 11,102,380 B2
(45) Date of Patent: Aug. 24, 2021

(54) MOTION DETECTION CIRCUIT AND MOTION DETECTION METHOD APPLIED TO CIS

(71) Applicants: SHANGHAI IC R&D CENTER CO., LTD., Shanghai (CN); CHENGDU IMAGE DESIGN TECHNOLOGY CO. LTD., Chengdu (CN)

(72) Inventors: Xi Zeng, Shanghai (CN); Jianxin Wen, Shanghai (CN); Yuqi Jin, Shanghai (CN); Ying Luo, Shanghai (CN)

(73) Assignees: SHANGHAI IC R&D CENTER CO., LTD, Shanghai (CN); CHENGDU IMAGE DESIGN TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/043,775

(22) PCT Filed: Aug. 29, 2018

(86) PCT No.: PCT/CN2018/102896
§ 371 (c)(1),
(2) Date: Sep. 30, 2020

(87) PCT Pub. No.: WO2019/218529
PCT Pub. Date: Nov. 21, 2019

(65) Prior Publication Data
US 2021/0092259 A1     Mar. 25, 2021

(30) Foreign Application Priority Data

May 16, 2018     (CN) .......................... 201810469339.4

(51) Int. Cl.
*H04N 5/374*     (2011.01)
*H04N 5/341*     (2011.01)
(Continued)

(52) U.S. Cl.
CPC ............. *H04N 5/144* (2013.01); *H04N 5/341* (2013.01); *H04N 5/3745* (2013.01)

(58) Field of Classification Search
CPC ...... H04N 5/3745; H04N 5/144; H04N 5/341; H04N 5/374; H04N 5/235; H04N 5/2355;
(Continued)

(56) References Cited

U.S. PATENT DOCUMENTS

| 9,936,132 B2 * | 4/2018 | Yoon .................. H04N 5/335 |
| 2010/0259626 A1 * | 10/2010 | Savidge ............. H04N 5/228 348/222.1 |

(Continued)

FOREIGN PATENT DOCUMENTS

CN     101938279 A   *   5/2011   .............. H03M 1/34

*Primary Examiner* — Marly S Camargo
(74) *Attorney, Agent, or Firm* — Tianchen LLC.; Yuan R. Li; Yi Fan Yin (57) ABSTRACT

The present invention discloses a motion detection circuit applied to CIS and a motion detection method. Through the current frame pixel signal sampling branch and the previous frame pixel signal sampling branch, the sampling of the current frame and the previous frame pixel signal is respectively controlled, and the previous frame pixel signal is transmitted to the first end of the first capacitor and the second capacitor connected in series, and then the first error reference signal and the second error reference signal related to the pixel signal of the previous frame, which are respectively output by the second ends of the first capacitor and the second capacitor that are not connected, are transmitted to the first comparator branch and the second comparator branch of the comparator branch respectively, by judging the high and low-state of the comparison signals of the current frame pixel signal and the first error reference signal, and the current frame pixel signal and the second error reference signal respectively output by the first comparator branch and the second comparator branch, so as to determine whether an (Continued)

image point reflected by the pixel points of the pixels connected with the motion detection circuit has moved or not.

18 Claims, 3 Drawing Sheets

(51) Int. Cl.
<table>
<tr><td>H04N 5/235</td><td>(2006.01)</td></tr>
<tr><td>H04N 5/228</td><td>(2006.01)</td></tr>
<tr><td>H04N 5/232</td><td>(2006.01)</td></tr>
<tr><td>H04N 5/353</td><td>(2011.01)</td></tr>
<tr><td>H04N 19/50</td><td>(2014.01)</td></tr>
<tr><td>H03M 1/12</td><td>(2006.01)</td></tr>
<tr><td>G06T 7/20</td><td>(2017.01)</td></tr>
<tr><td>G06T 3/40</td><td>(2006.01)</td></tr>
<tr><td>H04N 5/14</td><td>(2006.01)</td></tr>
<tr><td>H04N 5/3745</td><td>(2011.01)</td></tr>
</table>

(58) Field of Classification Search
CPC .... H04N 19/503; H04N 5/3535; H04N 5/228; H04N 5/225; H04N 5/23251; G06T 7/20; G06T 3/4015; H01L 27/1464; H01L 27/14621; H01L 27/14625; H01L 27/14627; H03M 1/12; H03M 1/124

USPC ...... 348/222.1, 208.4, 218.1, 294, 154, 155, 348/208.13, 220.1, 352, 402.1, 407.1, 348/413.1; 257/69, 204, 288, 291, 292, 257/293; 341/122, 123, 126, 155; 250/208.1

See application file for complete search history.

(56) References Cited

U.S. PATENT DOCUMENTS

<table>
<tr><td>2015/0042855 A1*</td><td>2/2015</td><td>Baek</td><td>H04N 5/353<br>348/294</td></tr>
<tr><td>2015/0249801 A1*</td><td>9/2015</td><td>Tokunaga</td><td>H03M 3/458<br>341/155</td></tr>
<tr><td>2015/0319341 A1*</td><td>11/2015</td><td>Sekine</td><td>H04N 5/144</td></tr>
<tr><td>2016/0043725 A1*</td><td>2/2016</td><td>Lee</td><td>H03K 21/026</td></tr>
<tr><td>2021/0099656 A1*</td><td>4/2021</td><td>Cho</td><td>H04N 5/374</td></tr>
</table>

* cited by examiner

MOTION DETECTION CIRCUIT AND MOTION DETECTION METHOD APPLIED TO CIS

CROSS-REFERENCE TO RELATED APPLICATION

This application claims priority of International Patent Application Serial No. PCT/CN2018/102896, filed Aug. 29, 2018, which is related to and claims priority of Chinese patent application Serial No. 201810469339.4, filed May 16, 2018. The entirety of each of the above-mentioned patent applications is hereby incorporated herein by reference and made a part of this specification.

TECHNICAL FIELD

The disclosure relates to the technical field of CMOS integrated circuit design, and particularly to a motion detection circuit and a motion detection method applied to CIS.

BACKGROUND

With the development of CMOS integrated circuit technology, electronic products have become more and more widely used in daily life, and have become an indispensable part in various fields.

For detection of moving objects, a CMOS image sensor (CIS) can be used to compare two frames of image data and determine whether the objects are in a moving state by detecting whether there is a difference between the two frames of the image data.

In an existing circuit for detecting motion of an object, it is generally necessary to compare a digital data of a previous frame image. However, when using this method, each time an analog-to-digital converter must be used for analog-to-digital conversion. Since the readout time of the circuit is limited by the conversion time of the analog-to-digital converter, the maximum achievable frame rate of the image sensor is reduced.

In addition, an existing motion detection circuit generally require an additional complicated detection circuit in addition to the image sensor, which leads to an increase of chip area, power consumption and cost.

SUMMARY

The purpose of the present invention is to overcome the above-mentioned defects existing in the prior art, and provide a motion detection circuit and a motion detection method applied to CIS.

To achieve the above object, the present invention provides a motion detection circuit applied to CIS, comprising:
 a comparator branch, which comprises a first comparator branch and a second comparator branch, the first comparator branch and the second comparator branch comprise a first input end, a second input end and an output end respectively;
 a current frame pixel signal sampling branch, one end is connected to a pixel structure output end of a CMOS image sensor, and the other end of the current frame pixel signal sampling branch is respectively connected to a first input end of the first comparator branch and a first input end of the second comparator branch, which used to respectively transmit a current frame pixel signal to the first comparator branch and the second comparator branch;
 a previous frame pixel signal sampling branch, one end is connected to the pixel structure output end of the CMOS image sensor through first ends of a first capacitor and a second capacitor connected in series, and the other end of the previous frame pixel signal sampling branch is connected with the second input end of the first comparator branch through a second end of the first capacitor, and is connected with the second input end of the second comparator branch through a second end of the second capacitor, which is used for transmitting a previous frame pixel signal firstly to the first end connected with the first capacitor and the second capacitor, and then a first error reference signal related to the previous frame pixel signal output by the second end of the first capacitor is transmitted to the first comparator branch, and a second error reference signal related to the previous frame pixel signal output by the second end of the second capacitor is transmitted to the second comparator branch;

Wherein, a comparison result signal for the current frame pixel signal and the first error reference signal, and a comparison result signal for the current frame pixel signal and the second error reference signal are output respectively by the output end of the first comparator branch and the output end of the second comparator branch, based on the high and low-states of the two comparison result signals, so as to judge whether an image point reflected by a pixel point of a pixel connected to the motion detection circuit has moved.

Further, the motion detection circuit applied to CIS further comprises: a first signal sampling switch arranged in the current frame pixel signal sampling branch, a second signal sampling switch arranged in the previous frame pixel signal sampling branch, a first comparison control switch, and a second comparison control switch; wherein:
 a first end of the first signal sampling switch is connected with a first end of the second signal sampling switch, which is jointly connected with the pixel structure output end of the CMOS image sensor; a second end of the first signal sampling switch is connected with the first input end of the first comparator branch and the first input end of the second comparator branch; a second end of the second signal sampling switch is jointly connected with the first end of the first capacitor and the first end of the second capacitor;
 the second end of the first capacitor is connected with a first end of the first comparison control switch, a second end of the first comparison control switch is connected with the second input end of the first comparator branch; the second end of the second capacitor is connected with a first end of the second comparison control switch, and a second end of the second comparison control switch is connected with the second input end of the second comparator branch.

Further, the motion detection circuit applied to CIS further comprises: a clearing and resetting branch, which is connected between the first end and the second end of the first capacitor and the second capacitor, and is used for clearing and resetting the two ends of the first capacitor and the second capacitor; the clearing and resetting branch is respectively connected with ground and an error signal.

Further, the motion detection circuit applied to CIS further comprises: a first signal sampling switch arranged in the current frame pixel signal sampling branch, a first comparison control switch, a second comparison control switch and a second signal sampling switch arranged in the previous frame pixel signal sampling branch, a first reset switch to a fourth reset switch arranged in the clearing and resetting branch; wherein:

the first end of the first signal sampling switch is connected with the first end of the second signal sampling switch, which are jointly connected with the pixel structure output end of the CMOS image sensor; the second end of the first signal sampling switch is connected with the first input end of the first comparator branch and the first input end of the second comparator branch; the second end of the second signal sampling switch is connected together with the first end of the first capacitor, the first end of the second capacitor, and the first end of the first reset switch;

the second end of the first capacitor is connected together with the first end of the first comparison control switch, the first end of the second reset switch and the first end of the fourth reset switch; the second end of the second capacitor is connected together with the first end of the second comparison control switch and the first end of the third reset switch;

the second end of the first reset switch, the second end of the second reset switch and the second end of the third reset switch are grounded together; the second end of the fourth reset switch is connected to the error signal;

the second end of the first comparison control switch is connected with the second input end of the first comparator branch; the second end of the second comparison control switch is connected with the second input end of the second comparator branch.

Further, each of the first input ends of the first comparator branch and the second comparator branch is a negative input end, and the second input end is a positive input end; or, each of the first input ends of the first comparator branch and the second comparator branch is the positive input end, and the second input end is the negative input end.

Further, the current frame pixel signal, the previous frame pixel signal, the first error reference signal, the second error reference signal and the comparison result signal are voltage signals.

The present invention also provides a motion detection method based on the above-mentioned motion detection circuit applied to CIS, including the following steps:

performing a clearing step, which comprising: using the clearing and resetting branch to connect the two ends of the first capacitor and the second capacitor to ground, and clearing signals at the two ends of the first capacitor and the second capacitor;

performing a resetting step, which comprising: resetting the two ends of the first capacitor and the second capacitor by the clearing and resetting branch, and obtaining a first capacitor reset signal value equals to the error signal value at the second end of the first capacitor, and a second capacitor reset signal value of zero value at the second end of the second capacitor;

performing a previous frame data reading step, which comprising: transmitting the previous frame pixel signal to the first end connected with the first capacitor and the second capacitor by the previous frame pixel signal sampling branch, reading the previous frame pixel signal, obtaining a first error reference signal value greater than a previous frame pixel signal value at the second end of the first capacitor, and obtaining a second error reference signal value less than the previous frame pixel signal value at the second end of the second capacitor;

performing a current frame data reading step, which comprising: reading a current frame pixel signal used by the current frame pixel signal sampling branch;

performing a data comparison step, which comprising: the first comparator branch is used to compare the current frame pixel signal output by the first comparator branch with the first error reference signal, and the second comparator branch is used to compare the current frame pixel signal output by the second comparator branch with the second error reference signal, and the comparison result signals is output respectively, based on the high and low states of the two comparison result signals, so as to judge whether the image point reflected by the pixel point of the pixel connected to the motion detection circuit has moved.

Further, in the data comparison step, when each of the first input ends of the first comparator branch and the second comparator branch is a negative input end, and each of the second input ends is a positive input end, the judgment method comprising:

if the current frame pixel signal value is greater than the first error reference signal value, both of the comparison result signals output by the first comparator branch and the second comparator branch are low-state signals, and the image point corresponding to the pixel point is judged to have moved; or if the current frame pixel signal value is less than the second error reference signal value, both of the comparison result signals output by the first comparator branch and the second comparator branch are high-state signals, and the image point corresponding to the pixel point is judged to have moved; or if the current frame pixel signal value is less than the first error reference signal value, and the current frame pixel signal value is greater than the second error reference signal value, the comparison result signal output by the first comparator branch is the high-state signal, and the comparison result signal output by the second comparator branch is the low-state signal, and the image point corresponding to the pixel point is judged to have not moved.

Further, in the data comparison step, when each of the first input ends of the first comparator branch and the second comparator branch is a positive input end, and the second input end is a negative input end, the judgment method comprising:

if the current frame pixel signal value is greater than the first error reference signal value, both of the comparison result signals output by the first comparator branch and the second comparator branch are high-state signals, and the image point corresponding to the pixel point is judged to have moved; or if the current frame pixel signal value is less than the second error reference signal value, both of the comparison result signals output by the first comparator branch and the second comparator branch are low-state signals, and the image point corresponding to the pixel point is judged to have moved; or if the current frame pixel signal value is less than the first error reference signal value, and the current frame pixel signal value is greater than the second error reference signal value, the comparison result signal output by the first comparator branch is the low-state signal, and the comparison result signal output by the second comparator branch is the high-state signal, and the image point corresponding to the pixel point is judged to have not moved.

Further, the current frame pixel signal, the previous frame pixel signal, the first capacitor reset signal value, the second capacitor reset signal value, the error signal, the first error reference signal, the second error reference signal, and the comparison result signal are voltage signals.

The advantages of the present invention is that by setting the current frame pixel signal sampling branch and the previous frame pixel signal sampling branch, respectively controlling samplings of pixel signals of the current frame and the previous frame, and the first capacitor and the second capacitor are arranged in series in the previous frame pixel signal sampling branch, so as to transmit the previous frame pixel signal to be compared to the first end where the first capacitor and the second capacitor are connected, and then the first error reference signal and the second error reference signal related to the previous frame pixel signal output respectively by the second ends of the first capacitor and the second capacitor not connected are transmitted respectively to the first comparator branch and the second comparator branch of the comparator branch, the first comparator branch and the second comparator branch respectively output comparison signals for the current frame pixel signal and the second error reference signal, and the current frame pixel signal and the first error reference signal, therefore, by judging the high and low-state of the comparison signals, only one data comparison is required to determine whether the image point reflected by the pixel point of the pixel connected with the motion detection circuit has moved. The present invention proposes the first capacitor and the second capacitor as storage capacitors, which can perform a motion detection on a currently photographed object in real time, and errors of two detected frame signals are determined by a externally input error signal value, which is convenient for adjustment; the motion detection can be completed according to the data comparison process of the comparator branch and the states of the analog signals output by the first comparator branch and the second comparator branch, and an analog-to-digital conversion is not required during each detection process, so as to completed the motion detection quickly, and the detection time is greatly shortened. In addition, the comparator branch can reuse the comparator branch in the CIS analog-to-digital conversion circuit, then in the case of multiplexing, the present invention only adds two capacitors and 8 switches compared with an ordinary CIS circuit, which can greatly simplify the structure compared to an ordinary motion detection circuit, and reduce the area.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
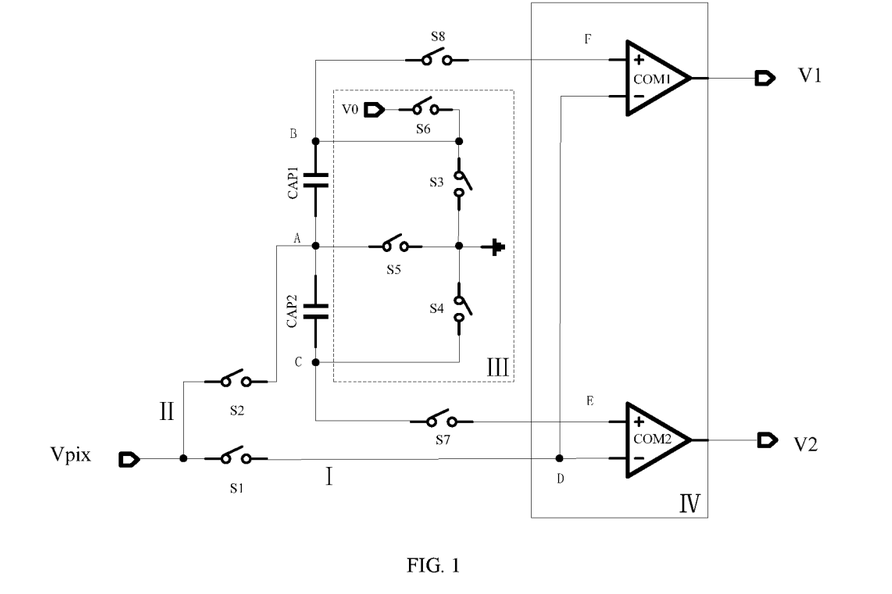
FIG. 1 is a schematic diagram showing a structure of a motion detection circuit applied to a CIS according to a preferred embodiment of the present invention.

Please refer to FIG. 1, FIG. 1 is a schematic structural diagram of a motion detection circuit applied to CIS according to a preferred embodiment of the present invention. As shown in FIG. 1, a motion detection circuit applied to CIS of the present invention comprises a comparator branch IV, a current frame pixel signal sampling branch I, and a previous frame pixel signal sampling branch II.

As shown in FIG. 1, the comparator branch IV (please refer to the dashed box where IV is located) comprises a first comparator branch COM1 and a second comparator branch COM2; the first comparator branch COM1 and the second comparator branch COM2 comprise a first input end, a second input end and an output end respectively.

One end of the current frame pixel signal sampling branch I is connected to a pixel structure output end (the pixel structure output end outputs a signal Vpix to the current frame pixel signal sampling branch I) of an CMOS image sensor, and the other end of the current frame pixel signal sampling branch I is respectively connected to a first input end of the first comparator branch COM1 and a first input end of the second comparator branch COM2. The current frame pixel signal sampling branch I is used to transmit a current frame pixel signal (Vpix) output from the pixel structure output end of the CMOS image sensor to the first comparator branch COM1 and the second comparator branch COM2 respectively.

One end of the previous frame pixel signal sampling branch II is connected to the pixel structure output end of the CMOS image sensor through first ends of a first capacitor CAP1 and a second capacitor CAP2 connected in series, and the other end of the previous frame pixel signal sampling branch II is connected to the comparator branch IV through unconnected second ends of the first capacitor CAP1 and the second capacitor CAP2, which means connected to a second input end of the first comparator branch COM1 through a second end of the first capacitor CAP1, and connected to the second input end of the second comparator branch COM2 through the second end of the second capacitor CAP2. The previous frame pixel signal sampling branch II is used for transmitting a previous frame pixel signal firstly to the first ends of the first capacitor CAP1 and the second capacitor CAP2 connected, and then a first error reference signal related to the previous frame pixel signal output by the second end of the first capacitor CAP1 is transmitted to the first comparator branch COM1, and a second error reference signal related to the previous frame pixel signal output by the second end of the second capacitor CAP2 is transmitted to the second comparator branch COM2.

A first signal sampling switch S1 can be set on the current frame pixel signal sampling branch I, and a second signal sampling switch S2 can be set on the previous frame pixel signal sampling branch II. The first signal sampling switch S1 and the second signal sampling switch S2 respectively control samplings of a current frame pixel signal and a previous frame pixel signal. A first end of the first signal sampling switch S1 is connected with a first end of the second signal sampling switch S2, which is jointly connected with the pixel structure output end of the CMOS image sensor. A second end of the first signal sampling switch S1 is respectively connected with a first input end of the first comparator branch COM1 and the first input end of the second comparator branch COM2 by a connection point D.

The first signal sampling switch S1 controls the transmission of the current frame pixel signal, when the first signal sampling switch S1 is turned off, the current frame pixel signal is respectively transmitted to the first comparator branch COM1 and the second comparator branch COM2, and the detection circuit performs a motion detection.

The second end of the second signal sampling switch S2 is jointly connected to the first end of the first capacitor CAP1 and the first end of the second capacitor CAP2, and can be connected to a common connection point A with the first end of the first capacitor CAP1 and the first end of the second capacitor CAP2. The second signal sampling switch S2 controls the transmission of the previous frame pixel signal, when the second signal sampling switch S2 is turned off, previous frame data to be compared is transferred to the common connection point A of the first capacitor CAP1 and the second capacitor CAP2.

A first comparison control switch S8 and a second comparison control switch S7 can also be set on the previous frame pixel signal sampling branch II. A first end of the first comparison control switch S8 is connected to the second end of the first capacitor CAP1, and a second end of the first comparison control switch S8 can be connected to the second input end of the first comparator branch COM1 through a connection point F; a first end of the second comparison control switch S7 is connected to the second end of the second capacitor CAP2, and a second end of the second comparison control switch S7 can be connected to the second input end of the second comparator branch COM2 through the connection point E.

The previous frame pixel signal sampling branch II can also be provided with a clearing and resetting branch III (please refer to the dashed box where III is located). The clearing and resetting branch III is connected between the first and second ends of the first capacitor CAP1 and the second capacitor CAP2, and is used for clearing and resetting the two ends of the first capacitor CAP1 and the second capacitor CAP2; the clearing and resetting branch is connected with ground and an error signal (V0).

The clearing and resetting branch III may comprise a first reset switch to a fourth reset switch S5, S3, S4, S6. The second end of the second signal sampling switch S2 is connected to the point A in common with the first end of the first capacitor CAP1, the first end of the second capacitor CAP2, and the first end of the first reset switch S5; the second end of the first capacitor CAP1 is connected to the point B in common with the first end of the first comparison control switch S8, the first end of the second reset switch S3 and the first end of the fourth reset switch S6; the second end of the capacitor CAP2 is connected to the point C in common with the first end of the second comparison control switch S7, the first end of the third reset switch S4; the second end of the first reset switch S5, the second end of the second reset switch S3 and the second end of the third reset switch S4 are commonly grounded; the second end of the fourth reset switch S6 is connected to the error signal (V0).

wherein, the error signal (V0) is the maximum allowable error range when the first error reference signal value is equal to the second error reference signal value, that is, when the absolute value of the difference between the two frame signals is smaller than the error signal (V0), the two signals are equal; when the absolute value of the difference between the two frame signals is greater than the error signal (V0), the two frame signals are not equal.

The first comparator branch COM1 and the second comparator branch COM2 of the comparator branch IV are two-input single-output circuits, each of the output ends of the first comparator branch COM1 and the second comparator branch COM2 is used for respectively outputting a comparison result. Each of the first input end of the first comparator branch COM1 and the second comparator branch COM2 is a negative input end, and the second input end is a positive input end, as shown in FIG. 1. Alternatively, each of the first input end of the first comparator branch COM1 and the second comparator branch COM2 is the positive input end, and the second input end is the negative input end.

An output end of the first comparator branch COM1 outputs a comparison signal between the current frame pixel signal and the first error reference signal, and an output end of the second comparator branch COM2 outputs a comparison signal between the current frame pixel signal and the second error reference signal, though the high and low state of the two comparison signals, as so to judge whether the image point reflected by the pixel point of the pixel connected to the motion detection circuit has moved. By comparing the motion detection results of the full-frame pixels, so as to judge whether an object is in a moving state.

The current frame pixel signal, the previous frame pixel signal, the first error reference signal, the second error reference signal, and the two comparison signals may all be voltage signals.

The motion detection circuit of the present invention can be connected to a pixel structure output end, a row of pixel structure output ends, or a column of pixel structure output ends of a CMOS image sensor. The structure of the comparator branch IV is not limited and does not affect circuit performance.

As shown in FIG. 1, as an optional implementation, the comparator branch IV may adopt a circuit form having a single-stage comparator structure. Alternatively, the comparator branch IV can also adopt a circuit form with a multi-stage comparator structure. In addition, the comparator branch IV can be commonly used in the analog-to-digital conversion circuit of the CMOS image sensor, that is, the comparator branch IV of the motion detection circuit and the analog-to-digital conversion circuit can be reused.

In addition, whether the comparator branch IV has an enable signal and related structures does not affect the circuit performance. An amplifier circuit may also be set between the pixel structure output end of the CMOS image sensor, the first signal sampling switch S1 and the second signal sampling switch S2, so as to amplify the pixel signal input to the motion detection circuit.

The following is a detailed description of a motion detection method of the present invention according to the above motion detection circuit applied to CIS through the specific implementation and the attached drawings. wherein, the current frame pixel signal, the previous frame pixel signal, the reset signal value of the first capacitor CAP1, the reset signal value of the second capacitor CAP2, the error signal, the first error reference signal, the second error reference signal, and the comparison result signal are all voltage signals.

Please refer to FIG. 2 to FIG. 6, which are schematic diagrams of different working states of the motion detection circuit of FIG. 1. As shown in FIG. 2 to FIG. 6, a motion detection method based on the above motion detection circuit applied to CIS of the present invention comprises the following steps:

The first step is to perform a clearing step, which comprising: using the clearing and resetting branch III to connect the two ends of the first capacitor CAP1 and the second capacitor CAP2 to ground, and clearing signals at the two ends of the first capacitor CAP1 and the second capacitor CAP2.

Figure 2:
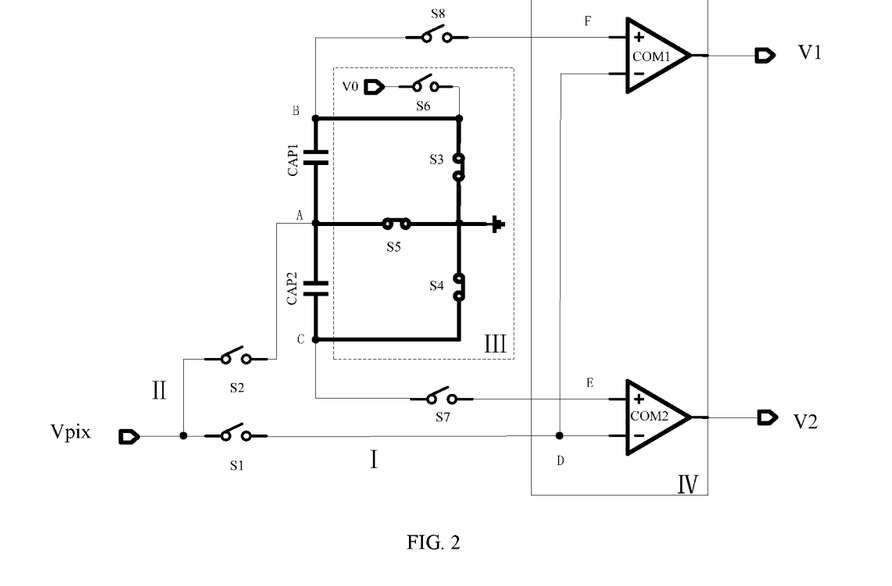
FIGS. 2 to 6 are schematic diagrams of different working states of the motion detection circuit of FIG. 1.

As shown in FIG. 2, a input voltage signal Vpix (the CIS pixel structure outputs the signal Vpix to the motion detection circuit) of the entire motion detection circuit is connected to the pixel structure output end of the CMOS image sensor, and the input voltage signal of the motion detection circuit is the output voltage signal Vpix of the CIS pixel structure. Record the output voltage of the output end of the first comparator branch COM1 of the comparator branch IV as V1 and the output voltage of the output end of the second comparator branch COM2 as V2; the voltage at the point A common connected with the first capacitor CAP1 and the second capacitor CAP2 is recorded as VA, the voltage at point B of the second end of the first capacitor CAP1 is recorded as VB, and the voltage at point C of the second end of the second capacitor CAP2 is recorded as VC; the voltage at the point D of the first input ends of the first comparator branch COM1 and the second comparator branch COM2 common connected with the first signal sampling switch S1 is recorded as VD, the voltage at the point F of the connection point of the second input end of the first comparator branch COM1 and the first comparison control switch S8 is VF, the voltage at the point E of the connection point of the second input end of the second comparator branch COM2 and the second comparison control switch S7 is recorded as VE; the error signal is recorded as V0.

The work of the entire motion detection circuit comprises five states (steps), which is clearing, resetting, reading of the previous frame data, reading of current frame data and data comparison. wherein, clearing, resetting, and reading of the previous frame data are performed when the comparison of the previous frame data is completed and the pixel structure is still outputting the previous frame data. Reading of the current frame data and data comparison are performed during the pixel structure is outputting the current frame data. The five working states of clearing, resetting, reading of the previous frame data, reading of the current frame data and data comparison are cycled in turn.

In the phase of data comparison, the non-common connection points B and C of the first capacitor CAP1 and the second capacitor CAP2 respectively output an error reference voltage (that is the first error reference voltage and the second error reference voltage) related to the previous frame data. wherein, in these two error reference voltages, the first error reference voltage is higher than the previous frame pixel signal, and the second error reference voltage is lower than the previous frame pixel signal, the first error reference voltage higher than the previous frame pixel signal is denoted as a high reference voltage, and the second error reference voltage lower than the previous frame pixel signal is denoted as a low reference voltage. The voltage across the first capacitor CAP1 and the second capacitor CAP2 is affected by the voltage at the common connection point A and the states of the four reset switches (the first reset switch to the fourth reset switch). The error signal V0 is the maximum allowable range when the values of the two frame signals are equal. That is, when the absolute value of the difference between the two frames is smaller than the error signal, the values of the two frame signals are determined to be equal; when the absolute value is greater than the error signal, the values of the two frame signals are not equal.

When the circuit is in the clearing state, the first reset switch S5, the second reset switch S3, and the third reset switch S4 are turned off (that is, one ends of the first reset switch S5, the second reset switch S3, and the third reset switch S4 are connected to ground), the two ends of the first capacitor CAP1 and the second capacitor CAP2 are connected to ground, the first signal sampling switch S1, the second signal sampling switch S2, the fourth reset switch S6, the first comparison control switch S8 and the second comparison control switch S7 are turned on; at this time, VA=0, VB=0, VC=0, and the two ends of the first capacitor CAP1 and the second capacitor CAP2 are cleared.

The clear operation can eliminate all error signals caused by adaptation or external interference at both ends of the capacitors, and ensure the accuracy of subsequent comparison results.

Second step is to perform a resetting step, which comprising: resetting the two ends of the first capacitor CAP1 and the second capacitor CAP2 by the clearing and resetting branch III, and obtaining a first capacitor reset signal equals to the error signal value V0 at the second end of the first capacitor CAP1, and a second capacitor reset signal value of zero value is obtained at the second end of the second capacitor CAP2.

Figure 3:
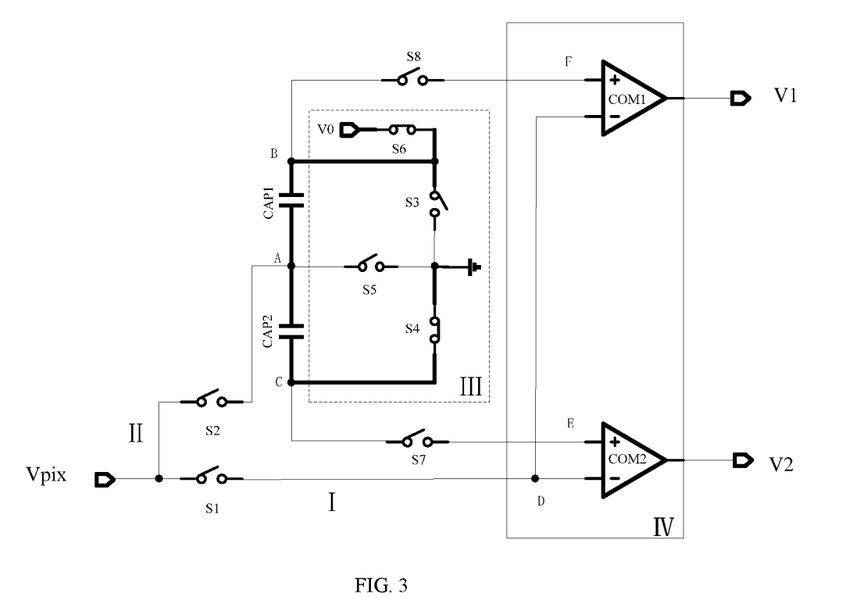

As shown in FIG. 3, when the clearing state is completed, the circuit enters the resetting state, and the third reset switch S4 and the fourth reset switch S6 are turned off, and the first signal sampling switch S1, the second signal sampling switch S2, the first reset switch S5, and the second reset switch S3, the first comparison control switch S8 and the second comparison control switch S7 are turned on, at this time, VB=V0 and VC=0, the two ends of the first capacitor CAP1 and the second capacitor CAP2 are reset. The capacitance values of the first capacitor CAP1 and the second capacitor CAP2 are respectively recorded as cv1 and cv2, then the voltage at the point A satisfies a following formula (Equation 1):

$$(VA-VC)\cdot cv2=(VB-VA)\cdot cv1 \qquad \text{Equation 1}$$

For convenience of explanation, cv1=cv2 is taken in the present embodiment, and then the voltage at the point A can satisfy a following formula (formula 2):

$$VA=(VB+VC)/2 \qquad \text{Equation 2}$$

In the resetting state, VA=V0/2.

In the resetting state of the present embodiment, the voltage at the point C may not be 0, that is, the third reset switch S4 may not be connected to ground (that is, it may be in an open state), but the difference between VA and VB and the difference between VB and VC are always half the difference between the error signal V0 and the signal VC.

Third step is to perform a reading step of the previous frame data, which comprising: transferring the previous frame pixel signal to the first end connected to the first capacitor CAP1 and the second capacitor CAP2 by the previous frame pixel signal sampling branch II, reading the previous frame pixel signal, the first error reference signal value greater than the previous frame pixel signal value is obtained at the second end of the first capacitor CAP1, and the second end error reference signal value less than the previous frame pixel signal value is obtained at the second end of the second end capacitor CAP2.

Figure 4:
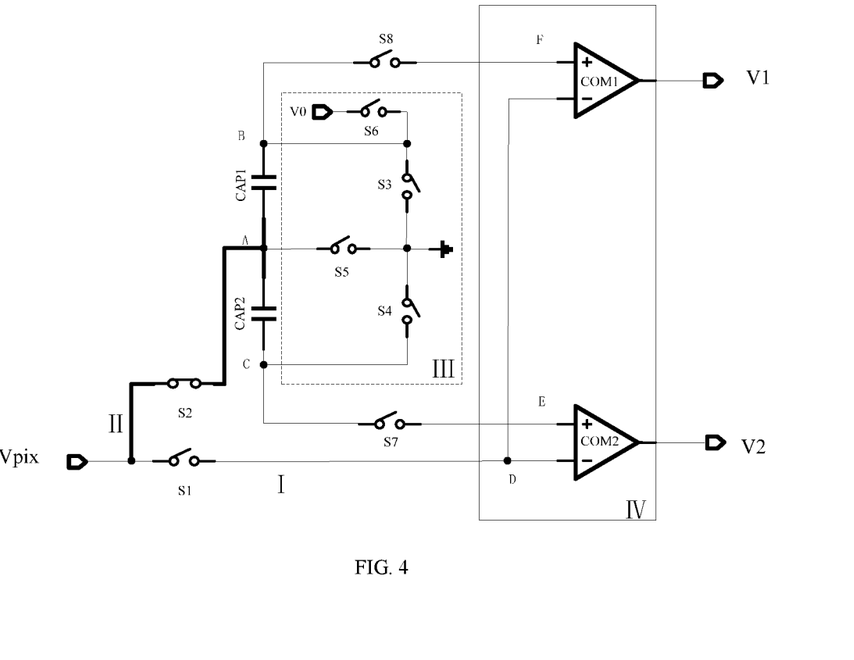

As shown in FIG. 4, when the resetting state is over, the circuit enters the reading step of the previous frame data, at this time, the second signal sampling switch S2 is turned off, the first signal sampling switch S1, the first reset switch S5, the second reset switch S3, the third reset switch S4, the fourth reset switch S6, the first comparison control switch S8 and the second comparison control switch S7 are turned on, so as to read the voltage of the previous frame pixel signal output from the output end of the pixel structure of the CMOS image sensor.

Because both of the points B and the point C are in a floating state, and due to the charge induction effect at both ends of the first capacitor CAP1 and the second capacitor CAP2, the voltage difference between the first capacitor CAP1 and the second capacitor CAP2 remains unchanged. Record the previous frame data output by the pixel as Vpix1, meanwhile, VA=Vpix1, VB=Vpix1+V0/2, and VC=Vpix1−V0/2. wherein, VB is a high reference voltage (the first error reference signal), VC is a low reference voltage (the second error reference signal), and VB and VC always maintain a fixed difference from the previous frame data, that is, when the error signal V0 is fixed, the values of the high reference signal and the low reference signal will be completely determined by the previous frame data.

The fourth step is to execute a reading step of the current frame data, which comprising: using the current frame pixel signal sampling branch I to read the current frame pixel signal.

Figure 5:
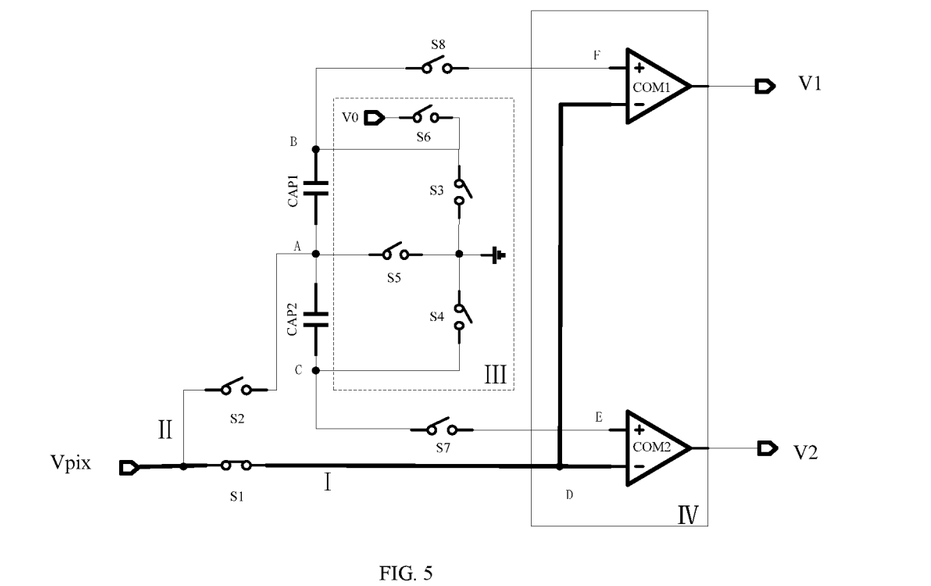

As shown in FIG. 5, when the reading of the previous frame data is completed, the pixel unit outputs the current frame data, the circuit enters a current frame data reading state, at this time, the first signal sampling switch S1 is turned off, the second signal sampling switch S2, the first reset switch S5, the second reset switch S3, the third reset switch S4, the fourth reset switch S6, the first comparison control switch S8 and the second comparison control switch S7 are turned on, and the current frame pixel signal value output from the output end of the pixel structure of the CMOS image sensor is read. The current frame data output by the pixel is recorded as Vpix2, then VD=Vpix2.

The fifth step is to perform a data comparison step, which comprising: using the first comparator branch COM1 to compare a current frame pixel signal with the first error reference signal, and using a second comparator branch COM2 to compare a current frame pixel signal with the second error signal, and a comparison result signal is output respectively, based on the high and low states of the two comparison result signals, it is determined whether the image point reflected by the pixel point of the pixel connected to the motion detection circuit has moved.

Figure 6:
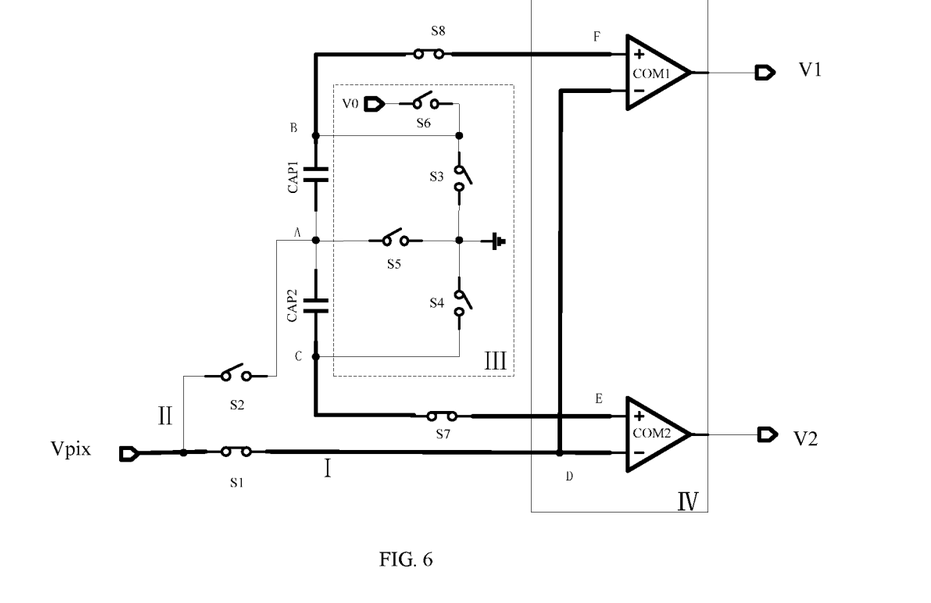

As shown in FIG. 6. In the present embodiment, each of the first input end of the first comparator branch COM1 and the second comparator branch COM2 is a negative input end, and the second input end is a positive input end for connection, that is, the current frame signal (signal through the point D) are connected to the negative input (−) of the first comparator branch COM1 and the second comparator branch COM2, and the point B is connected to the positive input end (+) of the first comparator branch COM1 through the point F, and the point C is connected to the positive input end (+) of the second comparator branch COM2 through the point E. When the reading of the previous frame data is completed, the circuit enters a data comparison state. At this time, the first signal sampling switch S1, the first comparison control switch S8 and the second comparison control switch S7 are turned off, the second signal sampling switch S2, the first reset switch S5, the second reset switch S3, and the third reset switch S4 and the fourth reset switch S6 are turned on, and the high reference signal enters the first comparator branch COM1, and the low reference signal enters the second comparator branch COM2. The following method can be used to determine whether the image points corresponding to the pixels have moved:

If the current frame pixel signal value is greater than the first error reference signal value, both of the comparison result signals output by the first comparator branch COM1 and the second comparator branch COM2 are low-state signals, and the image point corresponding to the pixel point is judged to have moved; or, If the current frame pixel signal value is less than the second error reference signal value, both of the comparison result signals output by the first comparator branch COM1 and the second comparator branch COM2 are high-state signals, and the image point corresponding to the pixel point is judged to have moved; or If the current frame pixel signal value is less than the first error reference signal value, and the current frame pixel signal value is greater than the second error reference signal value, the comparison result signal output by the first comparator branch COM1 is the high-state signal, and the comparison result signal output by the second comparator branch COM2 is the low-state signal, and the image point corresponding to the pixel point is judged to have not moved.

At this time, VF=VB=Vpix1+V0/2, and VE=VC=Vpix1−V0/2. In the present embodiment, the high-state voltages of V1 and V2 output by the comparator branch IV are denoted as VH, and the low-state voltages are denoted as VL.

For the first comparator branch COM1, if VD<VF, then V1=VH; if VD>VF, then V1=VL;

For the second comparator branch COM2, if VD<VE, then V2=VH; if VD>VE, then V2=VL;

That is, when Vpix2<Vpix1−V0/2, V1=VH, and V2=VH, at this time, the data of the two frames are not equal, and the corresponding image points of the circuit move.

When Vpix1−V0/2<Vpix2<Vpix1+V0/2, V1=VH, and V2=VL, at this time, the data of the two frames are equal, and the corresponding image points of the circuit do not move.

When Vpix2>Vpix1+V0/2, V1=VL, and V2=VL, at this time, the data of the two frames are not equal, and the corresponding image points of the circuit move.

For the entire image, a photographed object can be determined to move as long as any of the image points is detected, and a photographed object can be determined to not move only when all the image points are detected to not move. By detecting the results of V1 and V2 of all image points, the motion detection of the entire CIS image can be completed.

In the data comparison state in the present embodiment, the first signal sampling switch S1 can also be turned on, when the first signal sampling switch S1 is turned on, the point D is not charged and discharged, the voltage remains unchanged, which does not affect the circuit operation.

In the above embodiment, the connection modes of the input ends of the first comparator branch COM1 and the second comparator branch COM2 can be changed, and the determination of V1 and V2 will be changed, which does not affect the circuit operation. That is, if the current frame signal (the signal passing through the point D) is connected to the positive input end (+) of the first comparator branch COM1 and the second comparator branch COM2, the point B is connected to the negative end (−) of the first comparator branch COM1 through the point F, and the point C is connected to the negative input end (−) of the second comparator branch COM2 through the point E. Then, during comparison, For the first comparator branch COM1, if VD<VL, then V1=VL; if VD>VF, then V1=VH;

For the second comparator branch COM2, if VD<VE, then V2=VL; if VD>VE, then V2=VH;

That is, when Vpix2<Vpix1−V0/2, V1=VL, and V2=VL, at this time, the data of the two frames are not equal, and the corresponding image points of the circuit move.

When $Vpix1-V0/2<Vpix2<Vpix1+V0/2$, V1=VL, and V2=VH, at this time, the data of the two frames are equal, and the corresponding image points of the circuit do not move.

When $Vpix2>Vpix1+V0/2$, V1=VH, and V2=VH, at this time, the data of the two frames are not equal, and the corresponding image points of the circuit move.

In conclusion, the present invention sets the current frame pixel signal sampling branch and the previous frame pixel signal sampling branch, respectively controls samplings of pixel signals of the current frame and the previous frame, and the first capacitor and the second capacitor are arranged in series in the previous frame pixel signal sampling branch, so as to transmit the previous frame pixel signal to be compared to the first end where the first capacitor and the second capacitor are connected, and then the first error reference signal and the second error reference signal related to the previous frame pixel signal output respectively by the second ends of the first capacitor and the second capacitor not connected are transmitted respectively to the first comparator branch COM1 and the second comparator branch COM2 of the comparator branch IV, the first comparator branch COM1 and the second comparator branch COM2 respectively output comparison signals for the current frame pixel signal and the second error reference signal, and the current frame pixel signal and the first error reference signal, therefore, by judging the high and low state of the comparison signals, only one data comparison is required to determine whether the image point reflected by the pixel point of the pixel connected with the motion detection circuit has moved. The present invention proposes the first capacitor and the second capacitor as storage capacitors, which can perform a motion detection on a currently photographed object in real time, and errors of two detected frames signals are determined by a externally input error signal value, which is convenient for adjustment; the motion detection can be completed according to the data comparison process of the comparator branch IV and the states of the analog signals output by the first comparator branch COM1 and the second comparator branch COM2, and an analog-to-digital conversion is not required during each detection process, so as to completed the motion detection quickly, and the detection time is greatly shortened. In addition, the comparator branch IV can reuse the comparator branch IV in the CIS analog-to-digital conversion circuit, then in the case of multiplexing, the present invention only adds two capacitors and 8 switches compared with an ordinary CIS circuit, which can greatly simplify the structure compared to an ordinary motion detection circuit, and reduce the area.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A motion detection circuit applied to CIS, comprising:
    a comparator branch, which comprises a first comparator branch and a second comparator branch, the first comparator branch and the second comparator branch comprise a first input end, a second input end and an output end respectively;
    a current frame pixel signal sampling branch, one end is connected to a pixel structure output end of a CMOS image sensor, and the other end of the current frame pixel signal sampling branch is respectively connected to a first input end of the first comparator branch and a first input end of the second comparator branch, which used to respectively transmit a current frame pixel signal to the first comparator branch and the second comparator branch;
    a previous frame pixel signal sampling branch, one end is connected to the pixel structure output end of the CMOS image sensor through first ends of a first capacitor and a second capacitor connected in series, and the other end of the previous frame pixel signal sampling branch is connected with the second input end of the first comparator branch through a second end of the first capacitor, and is connected with the second input end of the second comparator branch through a second end of the second capacitor, which is used for transmitting a previous frame pixel signal firstly to the first end connected with the first capacitor and the second capacitor, and then a first error reference signal related to the previous frame pixel signal output by the second end of the first capacitor is transmitted to the first comparator branch, and a second error reference signal related to the previous frame pixel signal output by the second end of the second capacitor is transmitted to the second comparator branch;
    wherein, a comparison result signal for the current frame pixel signal and the first error reference signal, and a comparison result signal for the current frame pixel signal and the second error reference signal are output respectively by the output end of the first comparator branch and the output end of the second comparator branch, based on the high and low states of the two comparison result signals, so as to judge whether an image point reflected by a pixel point of a pixel connected to the motion detection circuit has moved.

2. The motion detection circuit of claim 1, further comprising: a first signal sampling switch arranged in the current frame pixel signal sampling branch, a second signal sampling switch arranged in the previous frame pixel signal sampling branch, a first comparison control switch, and a second comparison control switch; wherein:
    a first end of the first signal sampling switch is connected with a first end of the second signal sampling switch, which is jointly connected with the pixel structure output end of the CMOS image sensor; a second end of the first signal sampling switch is connected with the first input end of the first comparator branch and the first input end of the second comparator branch; a second end of the second signal sampling switch is jointly connected with the first end of the first capacitor and the first end of the second capacitor;
    the second end of the first capacitor is connected with a first end of the first comparison control switch, a second end of the first comparison control switch is connected with the second input end of the first comparator branch; the second end of the second capacitor is connected with a first end of the second comparison control switch, and a second end of the second comparison control switch is connected with the second input end of the second comparator branch.

3. The motion detection circuit of claim 1, further comprising: a clearing and resetting branch, which is connected between the first end and the second end of the first capacitor and the second capacitor, and is used for clearing and resetting the two ends of the first capacitor and the second capacitor; the clearing and resetting branch is connected with ground and an error signal.

4. The motion detection circuit of claim 3, further comprising: a first signal sampling switch arranged in the current frame pixel signal sampling branch, a first comparison control switch, a second comparison control switch and a second signal sampling switch arranged in the previous frame pixel signal sampling branch, a first reset switch to a fourth reset switch arranged in the clearing and resetting branch; wherein:

the first end of the first signal sampling switch is connected with the first end of the second signal sampling switch, which are jointly connected with the pixel structure output end of the CMOS image sensor; the second end of the first signal sampling switch is connected with the first input end of the first comparator branch and the first input end of the second comparator branch; the second end of the second signal sampling switch is connected together with the first end of the first capacitor, the first end of the second capacitor and the first end of the first reset switch;

the second end of the first capacitor is connected together with the first end of the first comparison control switch, the first end of the second reset switch and the first end of the fourth reset switch; the second end of the second capacitor is connected together with the first end of the second comparison control switch and the first end of the third reset switch;

the second end of the first reset switch, the second end of the second reset switch and the second end of the third reset switch are grounded together; the second end of the fourth reset switch is connected to the error signal;

the second end of the first comparison control switch is connected with the second input end of the first comparator branch; the second end of the second comparison control switch is connected with the second input end of the second comparator branch.

5. The motion detection circuit of claim 1, wherein each of the first input ends of the first comparator branch and the second comparator branch is a negative input end, and the second input end is a positive input end; or, each of the first input ends of the first comparator branch and the second comparator branch is the positive input end, and the second input end is the negative input end.

6. The motion detection circuit of claim 1, wherein the current frame pixel signal, the previous frame pixel signal, the first error reference signal, the second error reference signal and the comparison result signal are voltage signals.

7. A motion detection method based on the motion detection circuit of claim 3, comprising:

performing a clearing step, which comprising: using the clearing and resetting branch to connect the two ends of the first capacitor and the second capacitor to ground, and clearing signals at the two ends of the first capacitor and the second capacitor;

performing a resetting step, which comprising: resetting the two ends of the first capacitor and the second capacitor by the clearing and resetting branch, and obtaining a first capacitor reset signal value equals to the error signal value at the second end of the first capacitor, and a second capacitor reset signal value of zero value at the second end of the second capacitor;

performing a previous frame data reading step, which comprising: transmitting the previous frame pixel signal to the first end connected with the first capacitor and the second capacitor by the previous frame pixel signal sampling branch, reading the previous frame pixel signal, obtaining a first error reference signal value greater than a previous frame pixel signal value at the second end of the first capacitor, and obtaining a second error reference signal value less than the previous frame pixel signal value at the second end of the second capacitor;

performing a current frame data reading step, which comprising: reading a current frame pixel signal used by the current frame pixel signal sampling branch;

performing a data comparison step, which comprising: the first comparator branch is used to compare the current frame pixel signal output by the first comparator branch with the first error reference signal, and the second comparator branch is used to compare the current frame pixel signal output by the second comparator branch with the second error reference signal, and the comparison result signals is output respectively, based on the high and low states of the two comparison result signals, so as to judge whether the image point reflected by the pixel point of the pixel connected to the motion detection circuit has moved.

8. The method of claim 7, wherein in the data comparison step, when each of the first input ends of the first comparator branch and the second comparator branch is a negative input end, and each of the second input ends is a positive input end, the judgment method comprising:

if the current frame pixel signal value is greater than the first error reference signal value, both of the comparison result signals output by the first comparator branch and the second comparator branch are low-state signals, and the image point corresponding to the pixel point is judged to have moved; or if the current frame pixel signal value is less than the second error reference signal value, both of the comparison result signals output by the first comparator branch and the second comparator branch are high-state signals, and the image point corresponding to the pixel point is judged to have moved; or if the current frame pixel signal value is less than the first error reference signal value, and the current frame pixel signal value is greater than the second error reference signal value, the comparison result signal output by the first comparator branch is the high-state signal, and the comparison result signal output by the second comparator branch is the low-state signal, and the image point corresponding to the pixel point is judged to have not moved.

9. The method of claim 7, wherein in the data comparison step, when each of the first input ends of the first comparator branch and the second comparator branch is a positive input end, and the second input end is a negative input end, the judgment method comprising:

if the current frame pixel signal value is greater than the first error reference signal value, both of the comparison result signals output by the first comparator branch and the second comparator branch are high-state signals, and the image point corresponding to the pixel point is judged to have moved; or if the current frame pixel signal value is less than the second error reference signal value, both of the comparison result signals output by the first comparator branch and the second comparator branch are low-state signals, and the image point corresponding to the pixel point is judged to have moved; or if the current frame pixel signal value is less than the first error reference signal value, and the current frame pixel signal value is greater than the second error reference signal value, the comparison result signal output by the first comparator branch is the low-state signal, and the comparison result signal output by the second comparator branch is the high-state signal, and the image point corresponding to the pixel point is judged to have not moved.

10. The method of claim 7, wherein the current frame pixel signal, the previous frame pixel signal, the first capacitor reset signal value, the second capacitor reset signal value, the error signal, the first error reference signal, the second error reference signal, and the comparison result signal are voltage signals.

11. The motion detection circuit of claim 2, wherein each of the first input ends of the first comparator branch and the second comparator branch is a negative input end, and the second input end is a positive input end; or, each of the first input ends of the first comparator branch and the second comparator branch is the positive input end, and the second input end is the negative input end.

12. The motion detection circuit of claim 3, wherein each of the first input ends of the first comparator branch and the second comparator branch is a negative input end, and the second input end is a positive input end; or, each of the first input ends of the first comparator branch and the second comparator branch is the positive input end, and the second input end is the negative input end.

13. The motion detection circuit of claim 4, wherein each of the first input ends of the first comparator branch and the second comparator branch is a negative input end, and the second input end is a positive input end; or, each of the first input ends of the first comparator branch and the second comparator branch is the positive input end, and the second input end is the negative input end.

14. The motion detection circuit of claim 2, wherein the current frame pixel signal, the previous frame pixel signal, the first error reference signal, the second error reference signal and the comparison result signal are voltage signals.

15. The motion detection circuit of claim 3, wherein the current frame pixel signal, the previous frame pixel signal, the first error reference signal, the second error reference signal and the comparison result signal are voltage signals.

16. The motion detection circuit of claim 4, wherein the current frame pixel signal, the previous frame pixel signal, the first error reference signal, the second error reference signal and the comparison result signal are voltage signals.

17. The method of claim 8, wherein the current frame pixel signal, the previous frame pixel signal, the first capacitor reset signal value, the second capacitor reset signal value, the error signal, the first error reference signal, the second error reference signal, and the comparison result signal are voltage signals.

18. The method of claim 9, wherein the current frame pixel signal, the previous frame pixel signal, the first capacitor reset signal value, the second capacitor reset signal value, the error signal, the first error reference signal, the second error reference signal, and the comparison result signal are voltage signals.

* * * * *